(12) United States Patent
Vellore et al.

(10) Patent No.: US 7,321,992 B1
(45) Date of Patent: Jan. 22, 2008

(54) REDUCING APPLICATION DOWNTIME IN A CLUSTER USING USER-DEFINED RULES FOR PROACTIVE FAILOVER

(75) Inventors: Prabhakar Krishnamurthy Vellore, Irvine, CA (US); Mukund Hari Sharma, Los Alamitos, CA (US); Peng Liu, Tustin, CA (US)

(73) Assignee: Unisys Corporation, Blue Bell, PA (US)

( * ) Notice: Subject to any disclaimer, the term of this patent is extended or adjusted under 35 U.S.C. 154(b) by 396 days.

(21) Appl. No.: 10/401,478

(22) Filed: Mar. 28, 2003

Related U.S. Application Data

(63) Continuation-in-part of application No. 10/156,486, filed on May 28, 2002.

(51) Int. Cl.
*G06F 11/00* (2006.01)
(52) U.S. Cl. .......................................... 714/47; 714/13
(58) Field of Classification Search ...................... None
See application file for complete search history.

(56) References Cited

U.S. PATENT DOCUMENTS

| | | | | |
|---|---|---|---|---|
| 5,715,386 A | * | 2/1998 | Fulton et al. ................. | 714/38 |
| 5,805,785 A | * | 9/1998 | Dias et al. ..................... | 714/4 |
| 5,951,686 A | * | 9/1999 | McLaughlin et al. .......... | 713/2 |
| 6,216,237 B1 | * | 4/2001 | Klemm et al. ................. | 714/38 |
| 6,334,193 B1 | * | 12/2001 | Buzsaki ......................... | 714/2 |
| 6,334,196 B1 | * | 12/2001 | Smorodinsky et al. ........ | 714/37 |
| 6,393,485 B1 | * | 5/2002 | Chao et al. .................. | 709/231 |
| 6,446,218 B1 | * | 9/2002 | D'Souza ........................ | 714/4 |
| 6,553,416 B1 | * | 4/2003 | Chari et al. ................. | 709/224 |
| 6,594,784 B1 | * | 7/2003 | Harper et al. ................. | 714/47 |
| 6,629,266 B1 | * | 9/2003 | Harper et al. ................. | 714/38 |
| 6,865,580 B1 | * | 3/2005 | Bush ....................... | 707/103 Y |
| 6,947,957 B1 | * | 9/2005 | Lange ........................ | 707/200 |
| 7,103,652 B1 | * | 9/2006 | Dobberpuhl et al. ........ | 709/223 |
| 2003/0079154 A1 | * | 4/2003 | Park et al. ..................... | 714/1 |
| 2004/0010731 A1 | * | 1/2004 | Yu et al. ........................ | 714/4 |

* cited by examiner

*Primary Examiner*—Gabriel Chu
(74) *Attorney, Agent, or Firm*—Phuong-Quan Hoang; Robert P. Marley; Charles A. Johnson

(57) ABSTRACT

An embodiment of the invention is a method for proactive failover using user-defined rules. An event log of a first server node is monitored to check for user-specified application events. One of the user-specified application events corresponding to an impending failure in an application running on a first server node is detected. In automatic response to the detected impending failure, a proactive failover process is executed to transfer the application to a second server node for continued execution, the second server node being connected to the first server node in a cluster.

27 Claims, 7 Drawing Sheets

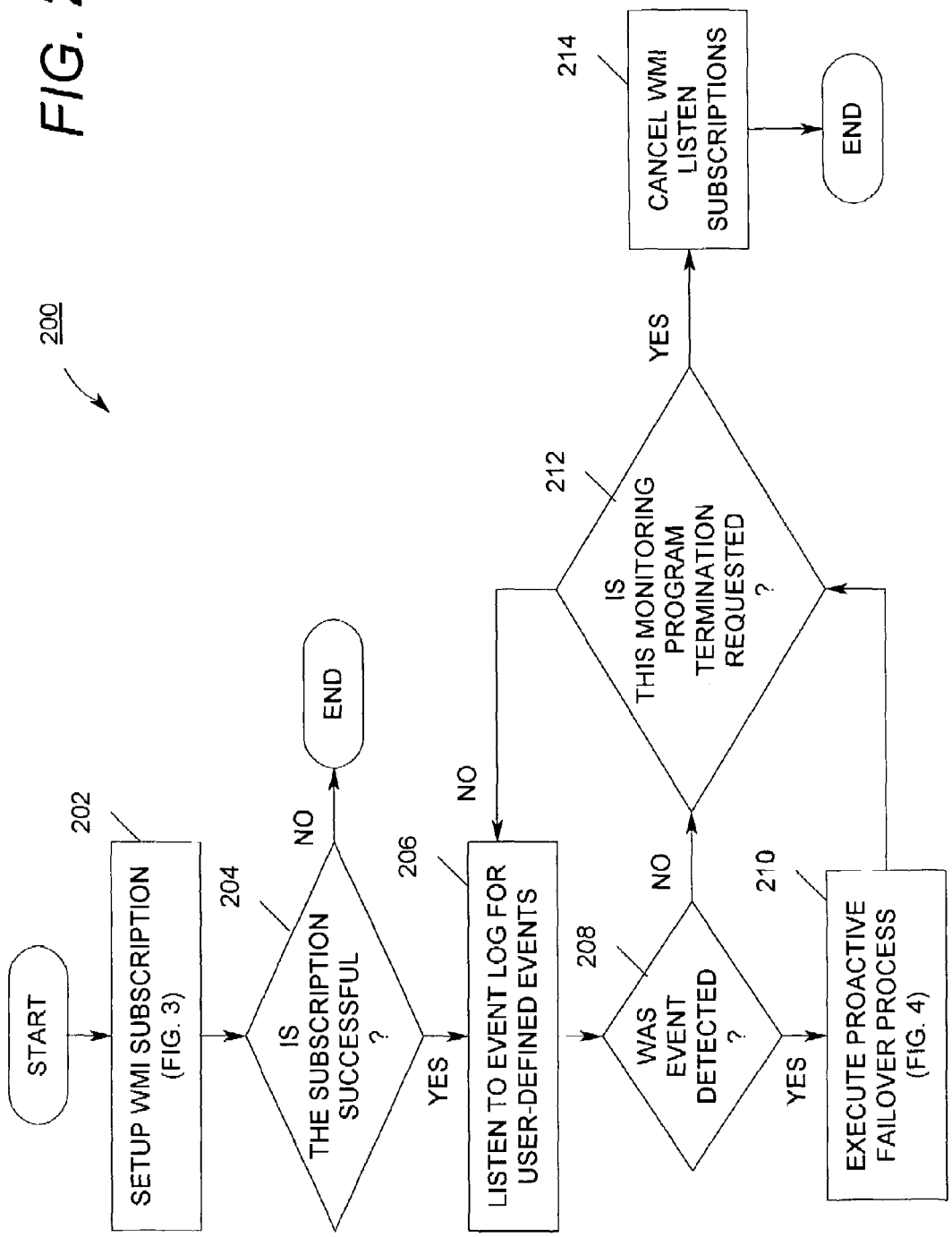

REDUCING APPLICATION DOWNTIME IN A CLUSTER USING USER-DEFINED RULES FOR PROACTIVE FAILOVER

CROSS-REFERENCE TO RELATED APPLICATIONS

This application is a continuation-in-part application of Ser. No. 10/156,486 entitled "Proactive Method For Ensuring Availability In A Clustered System", filed on May 28, 2002, the contents of which are herein incorporated by reference.

This application is related to the following applications: Ser. No. 10/143,408 entitled "Method for Reducing Spurious Failovers in a Geographically Dispersed Clustered System", filed on May 7, 2002; Ser. No. 09/892,276 entitled "Failover of a Simulated System in a Clustered Computing Environment", filed on Jun. 26, 2001; Ser. No. 10/153,397 entitled "Dynamic And Failover Load Balancing Solution Using Skinny Algorithm And Time Slot Configuration For MSCS", filed on May 21, 2002, the contents of each of which are herein incorporated by reference.

BACKGROUND OF THE INVENTION

1. Field of the Invention

The present invention generally relates to the field of clustered computer systems, and in particular to a method for reducing the downtime of a clustered application using user-defined rules.

2. Description of Related Art

A cluster is a group of computers that work together to run a common set of applications and appears as a single system to the client and applications. The computers are physically connected by cables and programmatically connected by cluster software. These connections allow the computers to use failover and load balancing, which is not possible with a stand-alone computer.

Clustering, provided by the cluster software, provides high availability for mission-critical applications such as databases, messaging systems, and file and print services. High availability means that the cluster is designed so as to avoid a single point-of-failure. Applications can be distributed over more than one computer, achieving a degree of parallelism and failure recovery, and providing more availability. Multiple nodes in a cluster remain in constant communication. If one of the nodes in a cluster becomes unavailable as a result of failure or maintenance, another node takes over the failing node's workload and begins providing service. This process is known as failover. With very high availability, users who were accessing the service should be able to continue to access the service, and should be unaware that the service is being provided by a different node.

In general, mission critical applications of an enterprise may have an availability requirement as high as 99.999%, which translates to no more than 5 minutes of downtime in a year. The failover feature is usually provided in clusters that run such mission critical applications.

However, the failover process itself could be time-consuming in situations where the failover is triggered after the application fails or terminates in an abnormal way. The process of failover involves various stages (FIG. 1B) of which the application data recovery could take a substantial amount of time, in some cases as high as 15-30 minutes.

The time needed for transferring the resources from a failed node to and resuming operation on a surviving node is determined by a variety of factors (such as the amount of data, and the state of data when the failure happened) and ranges from a few seconds to up to 30 minutes or even longer in some situations. The downtime duration of several minutes would be unacceptable for mission-critical applications.

Thus, there is a need to a method to reduce application downtime in a cluster that would also provide user control capability on the cluster level.

SUMMARY OF THE INVENTION

An embodiment of the invention is a method for proactive failover using user-defined rules. An event log of a first server node is monitored to check for user-specified application events. One of the user-specified application events corresponding to an impending failure in an application running on a first server node is detected. In automatic response to the detected impending failure, a proactive failover process is executed to transfer the application to a second server node for continued execution, the second server node being connected to the first server node in a cluster.

BRIEF DESCRIPTION OF THE DRAWINGS

FIG. 2 is a flowchart of an embodiment of the monitor module of the cluster monitor of the present invention.

DETAILED DESCRIPTION

One embodiment of the invention is a method for proactive failover using user-defined rules. An event log of a first server node is monitored to check for user-specified application events. One of the user-specified application events corresponding to an impending failure in an application running on a first server node is detected. In automatic response to the detected impending failure, a proactive failover process is executed to transfer the application to a second server node for continued execution, the second server node being connected to the first server node in a cluster.

In the following description, numerous specific details are set forth. However, it is understood that embodiments of the invention may be practiced without these specific details. In other instances, well-known circuits, structures, and techniques have not been shown in order not to obscure the understanding of this description.

It is noted that failover is not always the desired action in all error conditions that indicate impending failure of a clustered application. Some conditions may require other cluster actions, such as restarting the application on the same node, while other conditions may require just an administrative alert to an impending problem that can be corrected before the application fails. However, for clarity purpose, in describing this present method, only failover will be described as an automatic pre-failure action in response to an impending failure of a clustered application. A clustered application is defined as a cluster-aware application that can be run in a cluster environment.

Figure 1A:
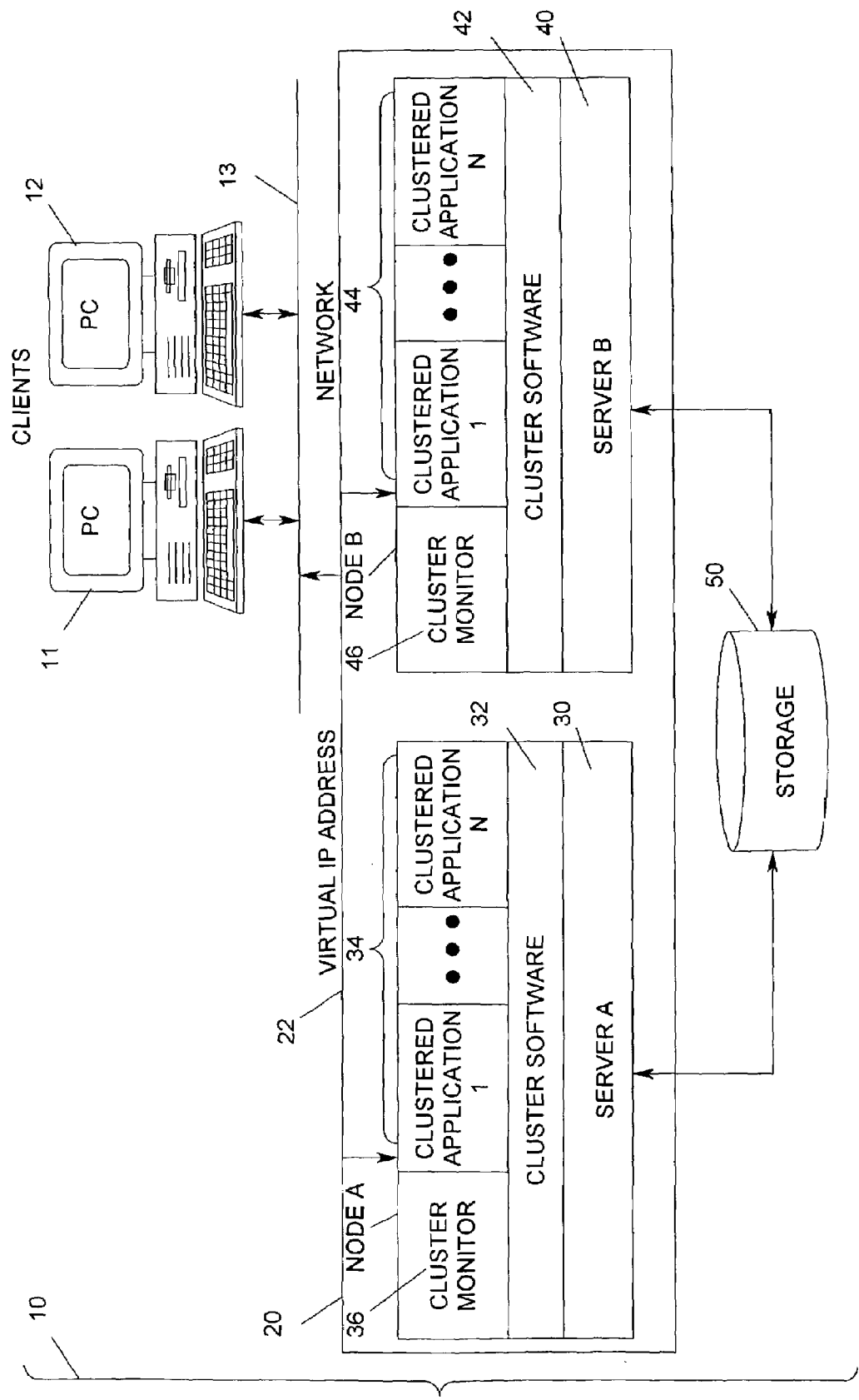
FIG. 1A is a generalized block diagram of an exemplary system in which the method of the present invention may be practiced.

FIG. 1A illustrates a client-server network 10 including a generalized block diagram of an exemplary cluster 20 in which one embodiment of the present invention may be practiced. Without the cluster monitors 36, 46 of the present invention, the system 20 would be a traditional cluster.

Exemplary client-server network 10 includes personal computer (PC) clients 11, 12, a cluster 20, and a common storage 50. The PC clients 11, 12 communicate with the cluster 20 via a communication network 13, using the virtual Internet Protocol (IP) address 22 of the cluster 20.

Cluster 20 comprises node A and node B. Node A includes a computer server A 30 and its associated memory. Cluster software 32 resides in the memory associated with computer server A. The cluster software 32 provides clustering services. Node B includes a computer server B 40 and its associated memory. Cluster software 42 resides in the memory associated with computer server B. The cluster software 42 provides clustering services. Cluster software 32 and 42 are identical. It is noted that in order for cluster 20 to operate as a cluster, identical copies of the cluster software must be running on each of the computer servers A, B.

Cluster monitor 36 embodying the method of the present invention resides in the memory associated with computer server A. Cluster monitor 36 monitors all the clustered applications that exist in the cluster 20, not just the clustered applications 34 in server node A.

Cluster monitor 46 is an identical copy of cluster monitor 36. Cluster monitor 46 embodying the method of the present invention resides in the memory associated with computer server B. Cluster monitor 46 monitors all the clustered applications that exist in the cluster 20, not just the clustered applications 44 in server node B.

The memory of computer server A (respectively, B) stores system code and data. The memory of server A (respectively, B) is typically implemented with dynamic random access memory (DRAM) or static random access memory (SRAM). The computer memory may include program code or code segments implementing one embodiment of the invention. The memory of server A (respectively, B) includes cluster monitor 36 (respectively, 46). Any one of the elements of the cluster monitor 36 (respectively, 46) may be implemented by hardware, software, firmware, microcode, or any combination thereof. The memory of server A (respectively, B) may also include other programs or data which are not shown, such as an operating system. The cluster monitor 36 (respectively, 46) contains instructions that, when executed by the computer server A (respectively, B), causes the cluster to perform the tasks or operations as described in the following.

Although FIG. 1A shows that a copy of the cluster monitor 36 is installed and running on each of the nodes A, B, it is important to note that, to practice the present invention, it is not necessary to have a copy of the cluster monitor running on each of the nodes in a cluster. Only one copy of the cluster monitor of the present invention is needed to be running on an active node, since the cluster monitor can monitor all the clustered applications in the cluster. In practice, to prevent interruption of cluster monitoring due to failure of an active server node, the cluster would have more than one copy of the cluster monitor running at any given time.

Computer servers A and B access a common storage device 50. Storage device 50 is used to store data for the clustered applications 34 and 44. Typically, only one computer server can access the common storage device at a time.

It is noted that, in other cluster configurations, using different type of cluster software and different type of operating system for the computer servers in the cluster, a common storage device may not be needed. In such a cluster with no common storage device, data for the clustered applications are copied and updated for each of the nodes in the cluster. In such a cluster, the downtime of an application in a traditional failover procedure would be less than that of a cluster employing a common storage device (as shown in FIG. 1A) but would still be substantial. The method of the present invention is still applicable in such a cluster to reduce the application downtime.

Figure 1B:
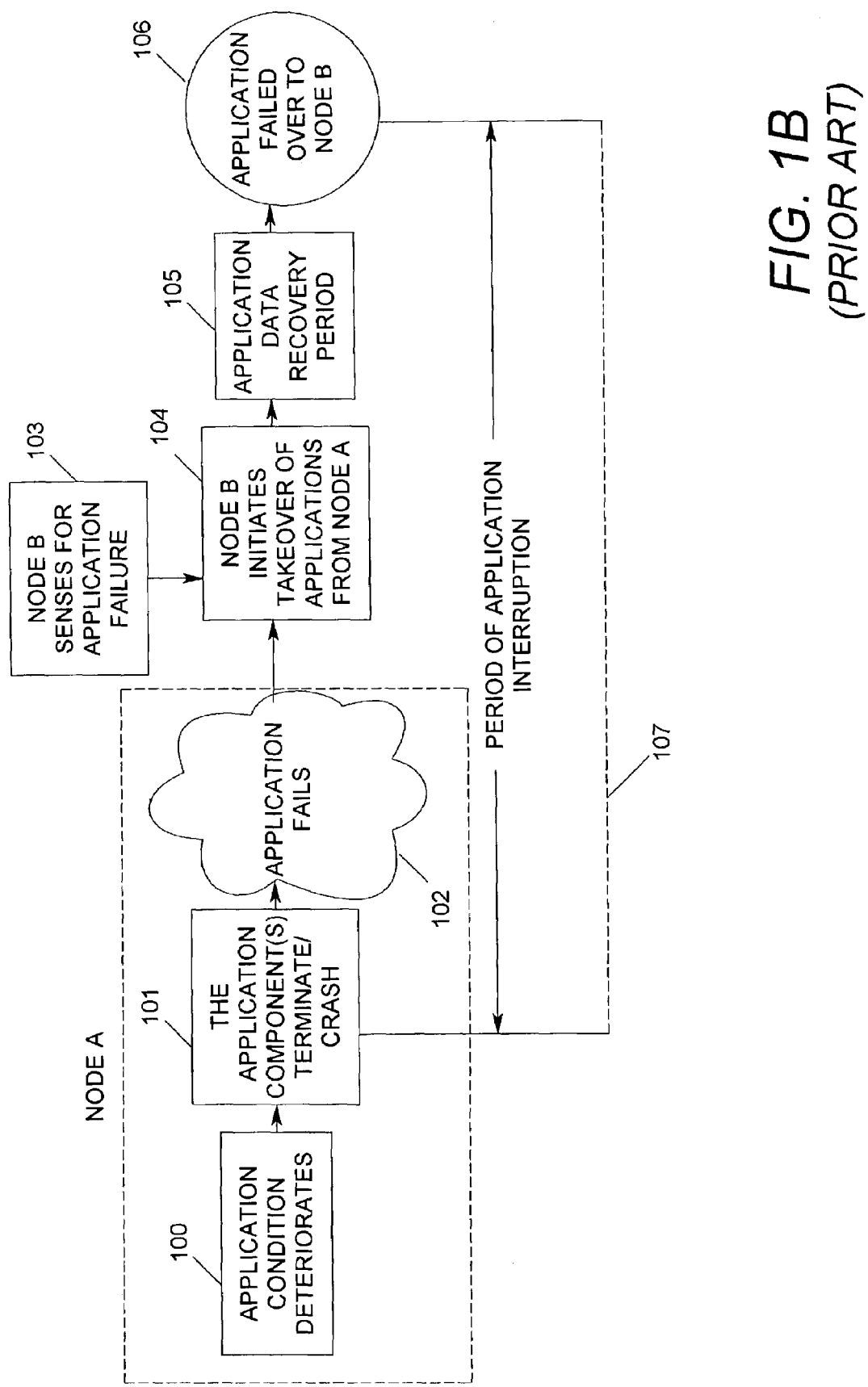
FIG. 1B shows a traditional application failover sequence.

FIG. 1B shows a traditional failover sequence. This traditional failover sequence would take place in a typical cluster, that is, a cluster similar to the cluster 20 shown in FIG. 1A but without the cluster monitors 36, 46 of the present invention. The condition of an application running on node A deteriorates (block 100). One or more components of this application terminate due to the deteriorating condition (block 101), causing the application failure (block 102). After the application on node A fails, node B senses the application failure, via the services of the cluster software running on node B (block 103). Node B initiates the takeover of the application from node A (block 104). Data for the failed application are recovered from the common storage device (block 105). After application data recovery, the application is failed over to node B, that is, continued execution of the application is now started on node B. Depending on the point of failure during execution, the failed application may not be restarted exactly from the point of failure. The duration of application interruption 107, i.e., the application downtime, is from the termination of a component of the application (block 101) to the start of continued execution of the application on node B (block 106).

In a cluster without a common storage, where data for the clustered applications are copied and updated for each node of the cluster, the application data recovery is not needed. However, depending on the point of failure during execution, the failed application may not be restarted exactly from the point of failure.

Figure 1C:
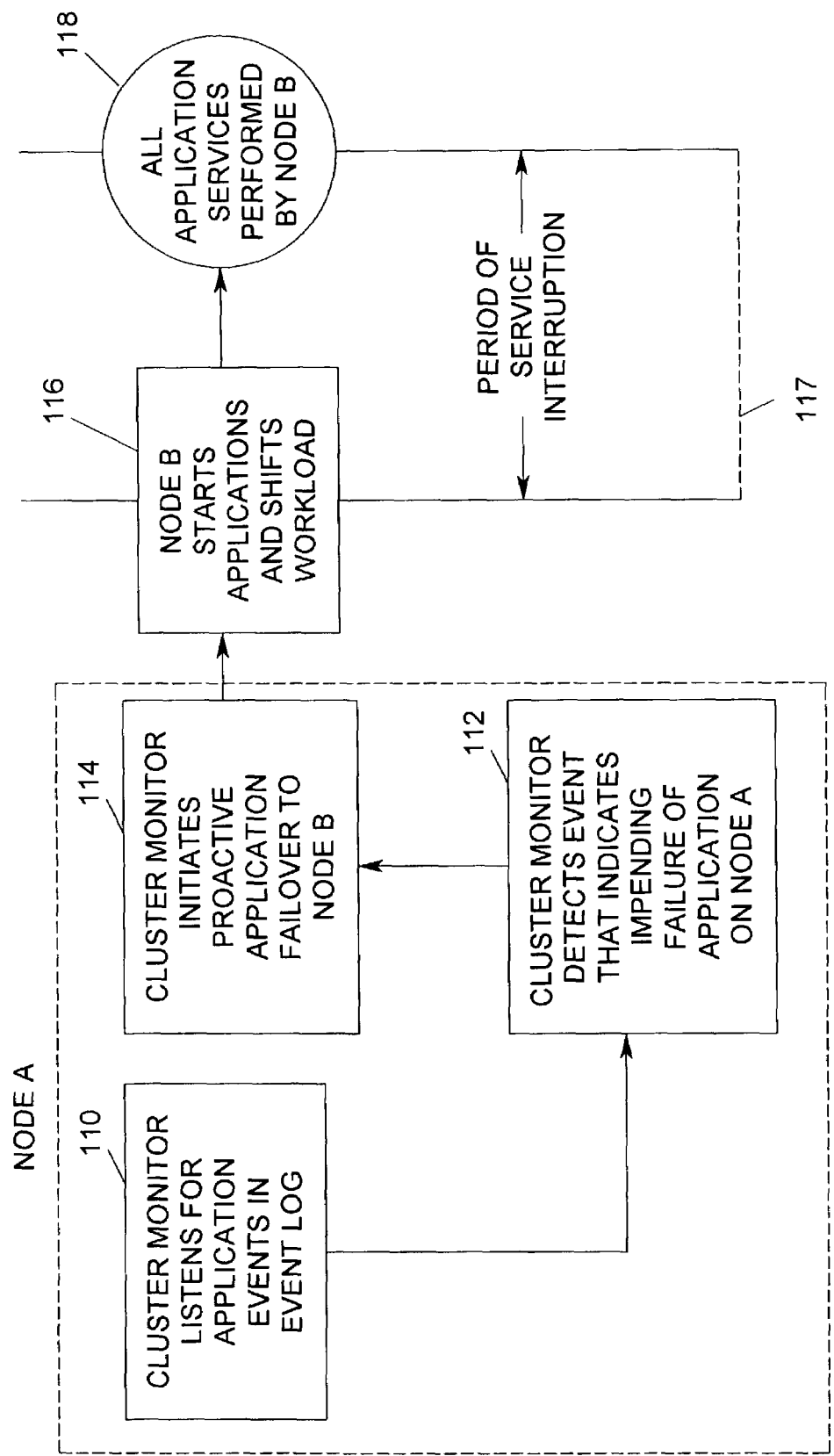
FIG. 1C is a diagram illustrating the new application failover sequence.

FIG. 1C shows a failover sequence that takes place when the cluster monitor of the present invention is running in a cluster, as shown in FIG. 1A. The cluster monitor listens for user-specified application events in the event log (block 110). One of the user-specified application events indicates an impending failure. The cluster-level automatic response, specified a priori by a user, to such user-specified application event, is to execute a failover process. The failover process will be described later in detail. The cluster monitor detects the user-specified application event that indicates in impending failure of an application running on node A (block 112). The cluster monitor executes the failover process, and initiates the proactive failover of the application to node B by sending a call to the cluster software 42 (block 114). Node B starts the application and shifts the workload of node A to node B (block 116). Note that at this point in time, the data for the application becomes available from the common storage device 50 (FIG. 1A). Then all application services is performed by node B (block 118). The period of application interruption 117 is from the instant node B starts the application and shifts the workload (block 116) to the instant the execution of the application is resumed on node B (block 118). This duration of application downtime 117 is substantially shorter than the traditional application downtime duration 107 shown in FIG. 1B. This is due to the fact that the failover shown in FIG. 1C is proactive, that is, executed in anticipation of an actual failure. The proactive failover is much more orderly than a traditional failover which takes place after an actual failure. The proactive failover is performed by shutting down and bringing up the application in an orderly fashion. This greatly reduces the amount of application data that is in transient form when the application goes down. The application needs to process and fix (or rollback) this transient data before declaring itself as fully available on the new node.

Note that, although the cluster software 32 or 42 (FIG. 1A) would allow a cluster administrator to manually start a so-called "administrative failover" before actually bringing down a node, such administrative failover would cause considerable application downtime because it involves manual handling on the part of the cluster administrator. Even if the cluster administrator observes the deteriorating condition of an application, he might not be able to manually initiate the failover before the actual failure of the application happens. In addition, since there is a large number of clustered applications running at any given time (in the order of hundreds or thousands), it is practically impossible to manually monitor their conditions.

Figure 1D:
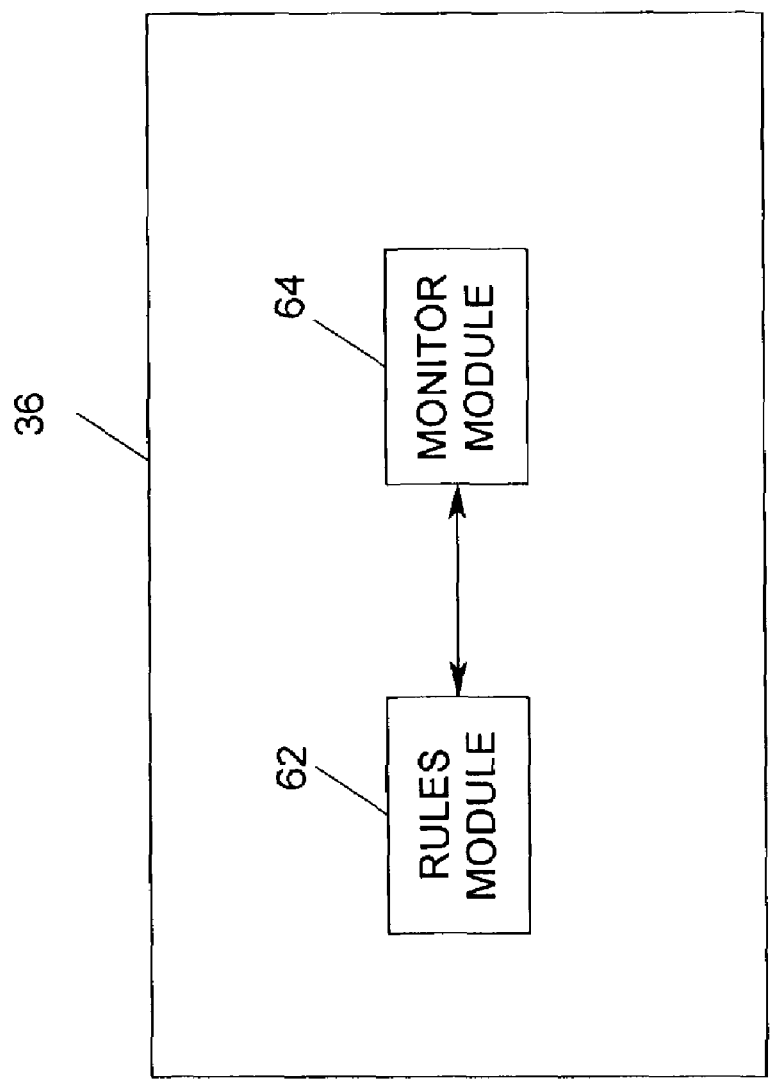
FIG. 1D is a block diagram of the cluster monitor of the present invention.

FIG. 1D is a block diagram of the cluster monitor of the present invention. Cluster monitor 36 comprises a rules module 62 and a monitor module 64.

As implemented in one embodiment, the cluster monitor of the present invention makes use of a feature of Microsoft Cluster Service called "Event Log replication" which automatically replicates an event reported by one of the cluster nodes in all other cluster nodes. This feature allows the cluster monitor to monitor from only one node for an event that can occur on any node in the cluster.

The rules module 62 allows a user to configure the rules for use by a rules engine in the cluster. The rules engine is used as a means of performing processing without the need to write explicit, deterministic programs. The processing to be performed is stated as a set of rules of the general form "WHEN <c1 & c2 . . . & cX> THEN <do r1, r2, . . . rZ>", where ci is a testable condition and rj is some action. As conditions change in the system, a rule is executed ("fired") when all of its conditions ci are met. Rules engine is well-known and need not be described in detail here. Rules module 62 allows a user to specify an application event as a testable condition, and a cluster-level automatic response as an action to the occurrence of that application event.

The rules module 62 provides the mechanism and the graphical user interface to allow to a user to specify application events and corresponding actions for applications of user interest. Each application has associated message files that list all possible application events that could occur with that application. The rules module 62 allows the user to select applications of interest, allows the user to select application events from the list of all the possible application events associated with a specific application of interest, and to select actions (such as executing proactive failover) corresponding to those selected application events. The actions are automatic responses of the cluster, at the cluster level, not at the node level. The user may select the same action for a group of different application events. For example, each of several application events may indicate impending failure of the application, and would necessitate the same action of executing the proactive failover process. The user may modify the list of the already selected application events by deleting a selected application event from the list or adding a new application event to the list. The user may also modify the corresponding selected actions. The rules module 62 stores these rules (correlations between user-specified application events and user-specified actions) in a database accessible by the monitor module 64.

In one embodiment, the rules module 62 makes use of the message libraries in a Windows programming architecture to provide to the user the list of all the possible application events associated with the user's applications of interest.

The Windows programming architecture requires application services to use one or more message libraries to store all the possible events associated with an application. Thus, a message DLL (Dynamic Link Library) contains all the unique information regarding the event (the ID, description, category, etc.) that an application can use to report its various conditions. An application event is uniquely defined by its Event ID, Source and Category, for all the clustered applications. Each of these events is stored as a "resource" (such as a bitmap, dialog box, etc.) the structure of which is defined by Win32 API. All message DLLs are required to be registered in the Windows System registry at a pre-defined location in a well-defined format. This feature allows the rules module 62 of the present invention to read all the events defined in a message DLL.

Other operating systems may have features similar to the Windows message libraries, where all the possible events associated with an application can be found. The present invention can be used in systems running under such operating systems.

The use of Windows message libraries in one embodiment should not be construed as a limitation of the present invention. It is obvious to one skilled in the art that, in a cluster where the operating system is other than Windows, feature similar to the Windows message libraries can be used. Therefore, herein, the term "message library" is used to designate such feature, and is not limited to the Windows message library.

As an example, the present invention can be used to address a known problem with Microsoft Exchange server application and perform the recommended fix/work-around documented in "Deploying Microsoft Exchange 2000 Server Service Pack 2 Clusters" white paper published by Microsoft Corporation on July 2001, available at the following web link: www. microsoft.com/germany/library/resourcesmod/xchsp2cl.doc.

MS Exchange Server 2000 is one of the popular e-mail server applications. It is very common for the MS Exchange Server to exist in an Microsoft Cluster Service cluster to make it highly available. Any down time will result in disruption of e-mail services for the users.

The cited white paper describes a known problem that would require failing over and (optionally) failing back exchange when the virtual memory for MS Exchange 2000 Server becomes excessively fragmented (that is, when the virtual memory total large free block bytes falls below 50 MB.)

The Information Store service, part of MS Exchange software, logs the two following events if the virtual memory for the Exchange 2000 Server becomes excessively fragmented:

EventID=9582
Severity=Warning

Facility=Perfmon
Language=English
The virtual memory necessary to run the Exchange server is fragmented in such a way that performance may be affected. It is highly recommended that one restart all Exchange services to correct this issue.

Note: This warning is logged if the largest free block is smaller than 32 MB.

EventID=9582
Severity=Error
Facility=Perfmon
Language=English
The virtual memory necessary to run the Exchange server is fragmented in such a way that normal operation may begin to fail. It is highly recommended that one restart all Exchange services to correct this issue.

Note This error is logged if the largest free block is smaller than 16 MB.

The rules module 62 of the present invention allows the user to define a rule that addresses the above error condition that can occur with MS Exchange. Such a rule comprises the above-mentioned application event from MS Exchange and the corresponding action of initiating Failover Exchange to any of other nodes in the cluster. This rule addresses this known problem with Exchange 2000 in an automatic fashion, thus removing monitoring on the part of the cluster administrator.

The monitor module 64 provides the monitoring of the event log (block 110 of FIG. 1C) to check for the user-specified application events stored in memory by the rules module 62, the detection of a user-specified application event indicating an impending failure of an application on node A (block 112 of FIG. 1C) and the execution of the proactive failover process in response to the detection of that user-specified application event (block 114 of FIG. 1C).

FIG. 2 is a flowchart of an embodiment 200 of the monitor module of the cluster monitor of the present invention. This embodiment 200 uses the Windows Management Instrumentation (WMI) Service to listen to the event log for the user-specified application events. WMI is the Microsoft implementation of Web-Based Enterprise Management (WBEM), which is an industry initiative to develop a standard technology for accessing management information in an enterprise environment. WMI Service is a Windows Service program (available in Windows 2000 and later operating systems from Microsoft). WMI Service is a key part of WMI infrastructure that enables exchanging management information between various WMI-based applications. WMI Service is used as just an example in one embodiment of the present invention. The use of WMI Service should not be construed as a limitation of the present invention. It is obvious to one skilled in the art that, in a cluster where the operating system is other than Windows, other software can be used for monitoring the event log.

Upon Start, process 200 sets up the subscription to WMI in order to receive from WMI notification of occurrences of application events for the applications of user interest, and corresponding event data (block 202). Process 200 checks whether the subscription is successful (block 204). If the subscription is not successful, i.e., the event log cannot be monitored for the specified events, process 200 terminates.

If the subscription to WMI is successful, process 200 listens to the event log for the application events of applications of user interest (block 206). When process 200 receives notification of occurrence of an application event for the applications of interest, process 200 checks whether the received application event is a user-specified application event corresponding to an impending failure has been detected (block 208). If no such event has been detected, process 200 checks whether a request to terminate this monitoring process 200 is received. If a termination request is received, process 200 cancels the subscription to the WMI Service (block 214), then terminates. If a termination request is not received, process 200 continues to listen to the event log (block 206).

If a user-specified application event corresponding to an impending failure is detected, process 200 executes the proactive failover process (block 210). Then process 200 checks whether a request to terminate this monitoring process 200 is received (block 212) and proceeds as described above.

Figure 3:
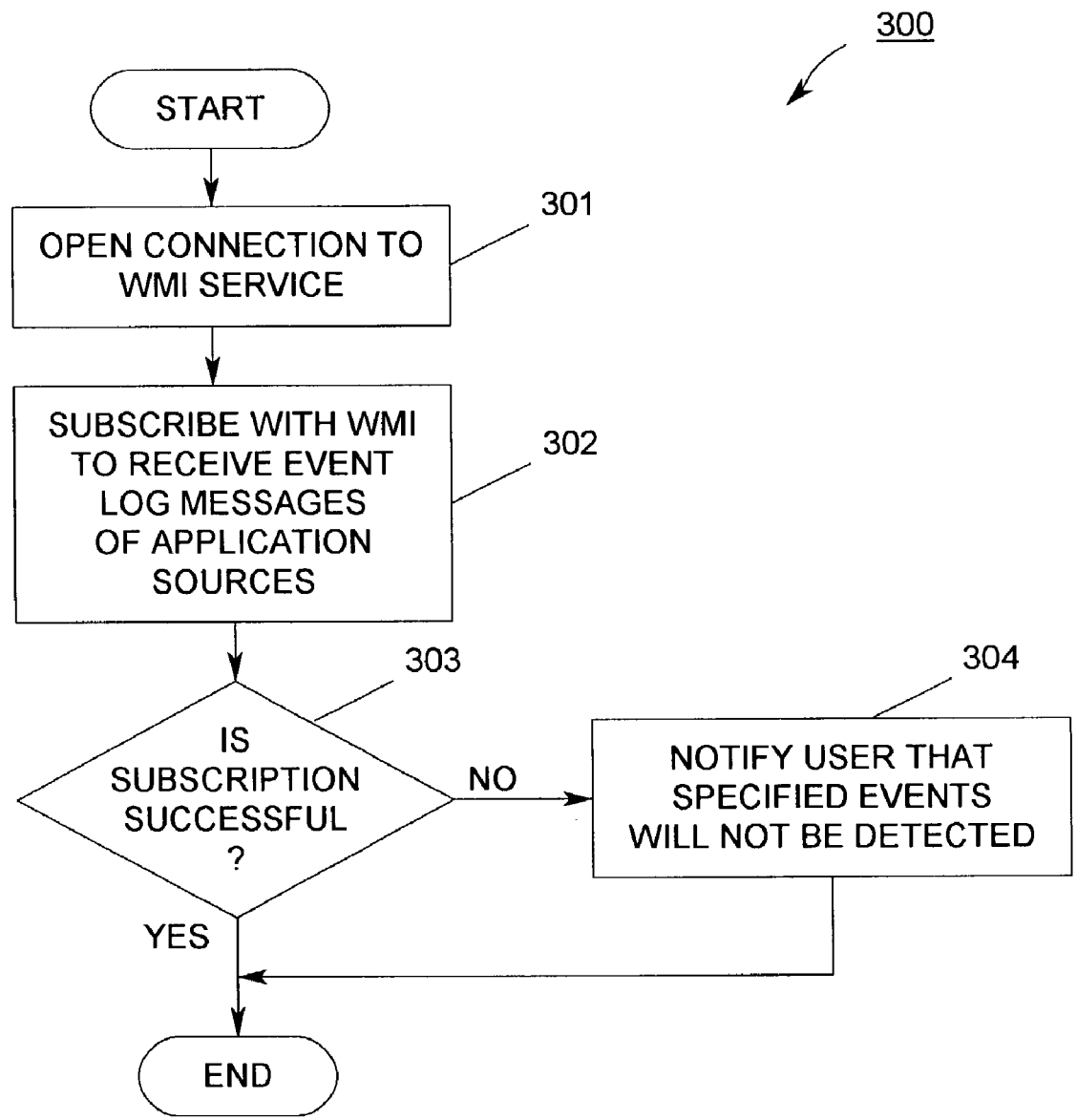
FIG. 3 is a flowchart illustrating the process of the subscription to the Windows Management Instrumentation (WMI) Service available in a Windows operating system to listen to the event log for the user-specified application events.

FIG. 3 is a flowchart illustrating process 300 of the subscription to the WMI Service (block 202).

Upon Start, process 300 opens the connection to WMI Service (block 301). Process 300 subscribes with WMI Service in order to receive notification of event log messages related to the applications of interest (that is, the applications specified by the user), along with corresponding event data (block 302). Process 303 checks whether the subscription to WMI is successful (block 303). If it is not successful, process 300 notifies the user that the user-specified events will not be detected (block 304) then terminates. If the subscription is successful, process 300 terminates.

Figure 4:
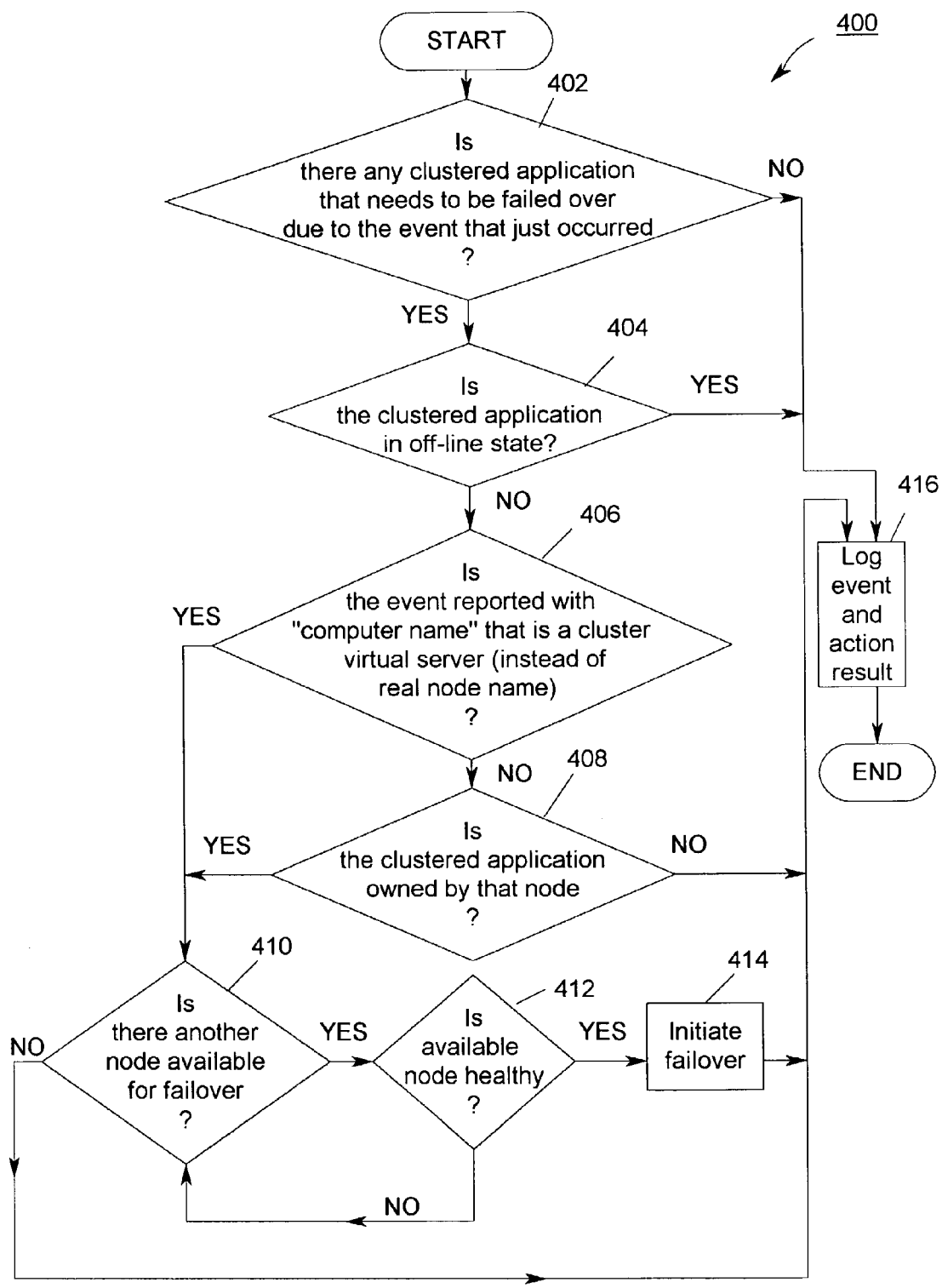
FIG. 4 is a flowchart of an embodiment of the proactive failover process executed in response to detection of impending failure.

FIG. 4 is a flowchart of an embodiment 400 of the proactive failover process (block 210 of FIG. 2).

Upon Start, process 400 checks whether there is any clustered application that needs to be failed over due to the detected event that just occurred (block 402). If there is none, process 400 logs the event and action result (block 416) for the record, then terminates.

If there is a clustered application to be failed over, process 400 checks whether this clustered application is in off-line state (block 404). If it is in off-line state, process 400 logs the event and action result (block 416) then terminates.

If the clustered application is not in off-line state, process 400 checks whether the event is reported with a "computer name" that is a cluster virtual server, instead of a real node name of a node (block 406). If the event is not reported with a "computer name", that is, it is reported with a real node name of a node, process 400 checks whether the clustered application is owned by that node (block 408). If the clustered application is not owned by that node, that is, if it is not currently running on that node, process 400 logs the event and action result (block 416) then terminates. Note that if the clustered application is not currently running on that deteriorating node, then there is no need to failover the clustered application.

If the event is reported with a "computer name" that is a cluster virtual server, this means that the application itself is complaining about its deteriorating condition and needs to be failed over, regardless of what node it is currently running on. In this case, process 400 checks whether there is any node available to failover (block 410). If there is no available node, then process 400 logs the event and action result (block 416) then terminates.

If there is an available node, process 400 checks whether this available node is healthy (block 412). Examples of parameters that indicate the health of a node are memory utilization, CPU utilization, page faults, and dynamic memory. If this available node is not healthy, process 400 checks whether there is any other available node for failover (block 410).

If the available node is healthy, process 400 initiates the failover of the clustered application by sending a call to the cluster software (block 414), logs the event and action result (block 416), then terminates.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "machine readable or accessible medium" may include any medium that can store, transmit, or transfer information. Examples of the machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code or instructions embedded therein. The program code or instructions may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process terminates when its operations are completed. A process may correspond to a method, a program, a procedure, a method of manufacturing or fabrication, etc.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising the operations of:
   (a) monitoring an event log of a first server node to check for user-specified application events;
   (b) detecting one of the user-specified application events, corresponding to an impending failure in an application running on the first server node; and
   (c) executing a proactive failover process, in automatic response to the detected impending failure, to transfer the application to a second server node for continued execution, the second server node being connected to the first server node in a cluster;
   wherein the proactive failover process includes:
   determining if the application is in off-line state; and
   if the application is in off-line state:
      logging the user-specified application event and corresponding action result; and
      terminating the proactive failover process.

2. The method of claim 1 further comprising the operations of:
   (d) specifying, via input from a user, application events corresponding to err conditions including an impending failure; and
   (e) specifying, via input from the user, cluster-level automatic responses corresponding to the user-specified application events.

3. The method of claim 2 wherein, in operation (e), the cluster-level automatic responses include executing the proactive failover process.

4. The method of claim 2 further comprising:
   utilizing at least one message library to access a list of possible application events associated with the application.

5. The method of claim 2 further comprising:
   modifying, via user input, one of the user-specified application events and a corresponding user-specified cluster-level automatic response.

6. The method of claim 2 further comprising:
   adding, via user input, a new user-specified application event to the user-specified application events and a corresponding user-specified cluster-level automatic response.

7. The method of claim 1 wherein operation (a) includes:
receiving notification of occurrence of a user-specified application event and corresponding application event data.

8. The method of claim 1 wherein the proactive failover process includes:
determining if the second server node is healthy; and
initiating failover if the second server node is healthy.

9. A method comprising the operations of:
(a) monitoring an event log of a first server node to check for user-specified application events;
(b) detecting one of the user-specified application events, corresponding to an impending failure in an application running on the first server node; and
(c) executing a proactive failover process, in automatic response to the detected impending failure, to transfer the application to a second server node for continued execution, the second server node being connected to the first server node in a cluster;
wherein the proactive failover process includes:
determining whether the user-specified application event is reported with a real node name of a node or with a computer name associated with a cluster virtual server, and
if the user-specified application event is reported with a real node name of a node:
determining if the application is owned by the node having the reported real node name; and
if the application is not owned by the node:
logging the user-specified application event and corresponding action result; and
terminating the proactive failover process.

10. An article of manufacture comprising:
a machine-accessible storage medium including data that, when accessed by a machine, causes the machine to perform operations comprising:
(a) monitoring an event log of a first server node to check for user-specified application events;
(b) detecting one of the user-specified application events, corresponding to an impending failure in an application running on the first server node; and
(c) executing a proactive failover process, in automatic response to the detected impending failure, to transfer the application to a second server node for continued execution, the second server node being connected to the first server node in a cluster;
wherein the data causing the machine to perform executing a proactive failover process comprises data that, when accessed by the machine, causes the machine to perform operations comprising:
determining if the application is in off-line state; and
is if the application is in of-line state:
logging the user-specified application event and corresponding action result; and
terminating the proactive failover process.

11. The article of manufacture of claim 10 wherein the data further comprises data that, when accessed by the machine, causes the machine to perform operations comprising:
(d) specifying, via user input, application events corresponding to error conditions including an impending failure; and
(e) specifying, via user input, cluster-level automatic responses corresponding to the user-specified application events.

12. The article of manufacture of claim 11 wherein the data causing the machine to perform operation (e) comprises data that, when accessed by the machine, causes the machine to perform the operation of:
executing the proactive failover process.

13. The article of manufacture of claim 11 wherein the data further comprises data that, when accessed by the machine, causes the machine to perform the operation of:
utilizing at least one message library to access a list of possible application events associated with the application.

14. The article of manufacture of claim 11 wherein the data further comprises data that, when accessed by the machine, causes the machine to perform the operation of:
modifying, via user input, one of the user-specified application events and a corresponding user-specified cluster-level automatic response.

15. The article of manufacture of claim 11 wherein the data further comprises data that, when accessed by the machine, causes the machine to perform the operation of:
adding, via user input, a new user-specified application event to the user-specified application events and a corresponding user-specified cluster-level automatic response.

16. The article of manufacture of claim 10 wherein the data causing the machine to perform monitoring an application event log of a first server node comprises data that, when accessed by the machine, causes the machine to perform the operation of:
receiving notification of occurrence of a user-specified application event and corresponding application event data.

17. The article of manufacture of claim 10 wherein the data causing the machine to perform executing a proactive failover process comprises data that, when accessed by the machine, causes the machine to perform operations comprising:
determining if the second server node is healthy; and
initiating failover if the second server node is healthy.

18. An article of manufacture comprising:
a machine-accessible storage medium including data that, when accessed by a machine, causes the machine to perform operations comprising:
(a) monitoring an event log of a first server node to check for user-specified application events;
(b) detecting one of the user-specified application events, corresponding to an impending failure in an application running on the first server node; and
(c) executing proactive failover process, in automatic response to the detected impending failure, to transfer the application to a second server node for continued execution, the second server node being connected to the first-server node in a cluster;
wherein the data causing the machine to perform executing a proactive failover process comprises data that, when accessed by the machine, causes the machine to perform operations comprising:
determining whether the user-specified application event is reported with a real node name of a node or with a computer name associated with a cluster virtual server; and
if the user-specified application event is reported with a real node name of a node:
determining if the application is owned by the node having the reported real node name; and
if the application is not owned by the node:

logging the user-specified application event and corresponding action result; and terminating the proactive fail over process.

19. A system comprising:

a cluster including at least a first server node and a second server node; and a memory included in the cluster, the memory containing instructions that, when executed by at least one of the first and second server nodes, cause the cluster to:

(a) monitor an event log of the first server node to check for user-specified application events;

(b) detect one of the user-specified application events, corresponding to an impending failure in an application running on the first server node; and (c) execute a proactive failover process, in automatic response to the detected impending failure, to transfer the application to a second server node for continued execution;

wherein the instructions causing the cluster to execute a proactive failover process comprises instructions that, when executed by the cluster, cause the cluster to:

determine if the application is in off-line state; and if the application is in off-line state:

log the user-specified application event and corresponding action result; and the proactive failover process.

20. The system of claim 19 wherein the instructions further comprises instructions that, when executed by the cluster, cause the cluster to:

(d) specify, via user input, application events corresponding to error conditions including an impending failure; and (e) specify, via user input, cluster-level automatic responses corresponding to the user-specified application events.

21. The system of claim 20 wherein the instructions causing the cluster to allow a user to specify cluster-level automatic responses corresponding to the user-specified application events comprises instructions that, when executed by the cluster, cause the cluster to:

specify, via user input, executing the proactive failover process.

22. The system of claim 20 wherein the instructions further comprises instructions that, when executed by the cluster, cause the cluster to:

utilize at least one message library to access a list of possible application events associated with the application.

23. The system of claim 20 wherein the instructions further comprises instructions that, when executed by the cluster, cause the cluster to:

modify, via user input, one of the user-specified application events and a corresponding user-specified cluster-level automatic response.

24. The system of claim 20 wherein the instructions further comprises instructions that, when executed by the cluster, cause the cluster to:

add, via user input, a new user-specified application event to the user-specified application events and a corresponding user-specified cluster-level automatic response.

25. The system of claim 19 wherein the instructions causing the cluster to monitor an application event log of the first server node comprises instructions that, when executed by the cluster, cause the cluster to:

receive notification of occurrence of a user-specified application event and corresponding application event data.

26. The system of claim 19 wherein the instructions causing the cluster to execute a proactive failover process comprises instructions that, when executed by the cluster, cause the cluster to:

determine if the second server node is healthy; and initiate failover if the second server node is healthy.

27. A system comprising:

a cluster including at least a first server node and a second server node; and a memory included in the cluster, the memory containing instruction that, when executed by at least one of the first and second server nodes, cause the cluster to:

(a) monitor an event log of the first server node to check for user-specified application events;

(b) detect one of the user-specified application events, corresponding to an impending failure in an application running on the first server node; and (c) execute a proactive failover process, in automatic response to the detected impending failure, to transfer the application to a second server node for continued execution;

wherein the instructions causing the cluster to execute a proactive failover process comprises instructions that, when executed by the cluster, cause the cluster to:

determine whether the user-specified application event is reported with a real node name of a node or with a computer name associated with a cluster virtual server; and if the user-specified application event is reported with a real node name of a node:

determine if the application is owned by the node having the reported real node name; and if the application is not owned by the node:

log the user-specified application event and corresponding action result; and terminate the proactive failover process.

* * * * *